Patented Feb. 6, 1940

2,189,133

UNITED STATES PATENT OFFICE 2,189,133

PHENOL-CELLULOSE RESIN

Leon E. Champer and Leo M. Christensen, Atchison, Kans., assignors to The Chemical Foundation, Incorporated, New York, N. Y., a corporation of Delaware No Drawing. Application April 13, 1937, Serial No. 136,604

3 Claims. (Cl. 260—10)

This invention relates to the manufacture of plastics, more particularly to the production of synthetic resins of improved color.

In recent years the field of application of synthetic plastics has broadened very considerably. The earlier uses of such products largely were based on technologically valuable properties, such as high dielectric strength, resistance to attacks of acids and alkalies, and the like. Now, however, such products rapidly are entering fields in which the decorative or esthetic value is also an important factor. For example, for the production of decorative panels, household ware, "objets d'art", and the like, the chromatic characteristic or tonal quality of the product is an established criterion of value.

The problem of lightening the color of synthetic plastics of the phenol methylene type is a difficult one. When utilizing typical starting materials and operating under the best conditions, the product obtained is of a distinctly deep amber, or darker color. When such earlier, relatively deeply colored products are mixed with white pigments, the resulting product presents a decidedly greyish cast and marked limitations are therefore imposed on the gradations of shades or tones which may be attained in the ultimate product.

We have found that, utilizing inexpensive starting materials, synthetic resins may be produced which are characterized by such a marked improvement in color that they may be combined with suitable pigments to produce white and light, delicately tinted, molded products. With the possibility of obtaining a white product once established, it will readily be appreciated that by the proper pigmentation a wide range or gradation of the lighter color values or tones immediately is made available.

As explained in copending application Serial No. 136,603, filed Apr. 13, 1937, it has been found that synthetic resins of a very light amber color may be produced by reacting carbohydrate material, such as cellulose, with phenolic bodies, under carefully controlled conditions of temperature and acid concentration. As there explained, when cellulose is reacted with an excess of phenol at temperatures of the order from substantially 60° C. to substantially 80° C. for a period of days and in the presence of very small amounts of a halogen acid, resins are formed which are distinctly lighter in color than those which were heretofore considered expectable from the particular starting materials.

It has now been found that the desirable light color of such products may be greatly accentuated or enhanced by carrying out the reaction under conditions which insure a low oxygen tension in the reaction system. There appears to be a distinct and beneficial correlation, in respect to the color modification, between the low temperature and low acid concentration conditions, on the one hand, and the non-oxidizing conditions on the other. It is possible that the maintenance of non-oxidizing conditions, in this particular type of low temperature reaction, not only checks the formation of darker colored products but also checks or inhibits the hydrolysis of the carbohydrate material to sugars, with the resulting formation of dark colored sugar type resins. Whatever may be the reactions which do take place, it is found in practice that operating under the stated conditions does insure the formation of resins of a very light color. Such products may be combined with suitable pigments or dyes to produce ultimate colors varying from a true white through the lighter color values.

The desired enhancement in color of the improved plastics may be secured by a number of specifically different methods. In one method, for example, 200 parts of phenol, containing from approximately 0.10 percent to 1 percent or more of hydrochloric acid, is reacted with 100 parts of a carbohydrate material, such as cellulose. The temperature of the reaction preferably is maintained between substantially 60° C. to approximately 80° C. for a period of about 60 hours, more or less, to insure the formation of a fusible, soluble resin. In accordance with the invention this initial reaction is effected in a non-oxidizing or reducing atmosphere. For this purpose the vapor space of the reaction kettle may be filled with a non-oxidizing or an inert gas, such as carbon dioxide, nitrogen, and the like. If desired, prior to bringing the material up to the stated reaction temperature, the kettle may be connected to a vacuum pump to evacuate the contained air, and the thus evacuated space may be replenished or filled with a non-oxidizing or inert gas under any desired pressure. After oxygen has been recovered from the vapor space and replaced with the non-oxidizing or inert gas, the mass may be brought up to reaction temperatures.

After the completion of the reaction, and the formation of the A stage resin, the excess phenol may be removed, preferably by vacuum distillation at about 160° C. The resulting molten mass may be discharged from the kettle into shallow containers and allowed to cool. This mass may then be broken up, neutralized, and then milled, or otherwise admixed, with suitable fillers, such as wood flour, asbestos, cotton linters, bleached vegetable fibers, and the like. If desired the fusible or A stage resin may be dissolved in a volatile solvent, such as alcohol, and while in such liquid condition may be admixed with the filler, after which the solvent may be evaporated.

In the manner well known to those skilled in the art, after the fusible form of the resin has been homogeneously distributed through or incorporated with the filler, it may be admitted to suitable molds and then transformed to the C or insoluble and fusible stage under the action of elevated temperatures of the order of 160° C., more or less, and pressures of the order of 1000 lbs. per sq. in.

It is found as a result of this treatment, namely by carrying out the reaction under conditions of minimal acid concentrations, low temperatures and under non-oxidizing conditions, a product of superior color is obtained. The product so produced is of a very light golden or yellow color of low tinctorial value. As a result of this marked diminution in color, the product may be incorporated with white pigments to produce a truly white product. Since the initial product produced is very light in color, it may be incorporated with other pigments, or dyes, so as to produce products of substantially any desired color value. It is particularly to be observed that because of the light color of the initial product, the tinctorial value of the dye or pigment employed is utilized to the greatest advantage, since there is little or no masking of the color of the pigment by the resin. Similarly, because of this color neutrality of the initial resin, a ready standardization of ultimate color and the utilization of a wider range of pigments is made possible, with the consequent production of a final product presenting a greatly increased gradation of color values.

Within the concept of the invention other and specifically different methods of production may be utilized. For example, instead of carrying out a reaction of the type described, that is to say in the presence of carbon-dioxide, nitrogen or the like, the reaction may be carried out in the presence of hydrogen. For this purpose the vapor space of the reaction kettle may be connected to an evacuating pump for the purpose of evacuating the air, and the evacuated air may be replaced with hydrogen. Operating with this type of process a still further improvement in color is obtained, particularly when a high partial pressure of hydrogen is maintained during the reaction. For example, operations have been carried out in which phenol and cellulose have been reacted under the temperature and catalytic conditions described, and under a pressure of from 1 to 10 atmospheres of hydrogen. In these circumstances the A stage, or initial, resin is of a very light color, amenable to ready pigmentation, or dyeing, with substantially quantitative chromatic results; that is to say, with this type of light colored resin, the amount of pigment necessary to be added to secure the desired ultimate color can accurately be predetermined, since there is no masking effect of the color of the pigment by the resin itself.

In another modification of the invention marked enhancement of the color of the product may be secured by carrying out the reaction in the presence of active reducing agents. For example, reducing substances, such as sodium thiosulphate, or equivalent compounds, may be homogeneously incorporated in the initial reactive mixture. During operation such substances function in general similarly to the non-oxidizing or reducing atmosphere. In conducting this type of operation a relatively minor amount of the reducing agent is found to be very effective. In typical operations, for example, substantially 5% of the reducing substance, based on the quantity of phenol, serves effectively to procure the desired reduction in the color of the product. In this type of operation the reducing agent preferably is first homogeneously mixed with or distributed through the phenol, after which the phenol-reducing agent mixture may be added to the carbohydrate starting material, such as the cellulose or lignin.

It will be appreciated that in effectuating the principles of the invention various modifications of the fundamental process may be made. Thus, in carrying out the process utilizing an atmosphere of hydrogen, it will readily be appreciated that the hydrogen employed may be circulated to and from the container, and during such circulation heat may be added to, or abstracted from, the gas. Similarly, during this recirculation the gas may be scrubbed to remove any undesired components therefrom. By the proper association of elements of apparatus the hydrogen employed during the reaction may effectively be recovered for reemployment in subsequent treatments.

It is to be observed that while the preferred operations under the invention involve the reaction of carbohydrate material with phenol and small concentrations of a halogen containing catalyst under non-oxidizing or reducing conditions, the scope of the invention is not limited to such specific methods. It is found that the desirable light color may be established in resins produced from carbohydrate material in which other and specifically different catalysts are employed. The process is generally applicable to the production of light colored resins from such starting material, in which the reaction conditions are so controlled as to minimize or inhibit excessive hydrolysis of the carbohydrate material and to insure the establishment of non-oxidizing conditions. Thus, resins of the character described may be produced from carbohydrate materials and phenolic bodies by carrying out the reaction under non-oxidizing or reducing conditions and in the presence of catalysts, like sulphuric acid, but in which the concentration of the acid is maintained sufficiently low to substantially preclude the formation of a deeply colored sugar-type resin.

The products produced according to the invention not only are of a desirably light color, but also are of improved physical and physico-chemical characteristics. Such products possess excellent mechanical and electrical properties and are particularly characterized by a marked resistance to chemical attack.

We claim:

1. A process of producing light-colored synthetic resins which comprises, reacting cellulose with an excess of phenol, in the presence of up to substantially 1% of hydrochloric acid and up to substantially 5% of an active reducing agent, based on the quantity of the phenol, and effecting the reaction at temperatures between substantially 60° C. and substantially 80° C. and under reducing conditions for a period of substantially four days to insure the formation of a light colored, fusible, soluble resin; removing excess phenol and polymerizing the residual material to a C-stage resin.

2. A potentially reactive resinous product characterized by an extremely light color which is formed by reacting phenol and cellulose, in the presence of from substantially 0.1 to 1.0 percent. of hydrochloric acid at temperatures between substantially 60° C. and substantially 80° C., and under non-oxidizing conditions for a period of substantially four days to insure the formation of a light colored, fusible, soluble resin, which potentially reactive product may be polymerized to a C-stage resin at a temperature of 160° C. and pressure of the order of 1,000 pounds per square inch.

3. A process of producing a light-colored synthetic resins which comprises, reacting cellulose with an excess of phenol in the presence of substantially 1 per cent of hydrochloric acid and at temperatures of between substantially 60° C. and subtantially 80° C. and in a hydrogen atmosphere for a period of four days to produce a light-colored, fusible, soluble resin; removing excess phenol and polymerizing the residual material to a C-stage resin at temperatures of substantially of 160° C. and pressure of the order of 1,000 pounds per square inch.

LEON E. CHAMPER.
LEO M. CHRISTENSEN.